United States Patent
Preuss et al.

(10) Patent No.: US 10,697,443 B2
(45) Date of Patent: Jun. 30, 2020

(54) EXHAUST AIR CONDUIT FOR A COATING AGENT PUMP

(71) Applicant: Dürr Systems AG, Bietigheim-Bissingen (DE)

(72) Inventors: Kevin Preuss, Wiehl (DE); Roland Gerlach, Bietigheim-Bissingen (DE); Ralf Schäfer, Ludwigsburg (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 218 days.

(21) Appl. No.: 15/309,448

(22) PCT Filed: May 4, 2015

(86) PCT No.: PCT/EP2015/000908
§ 371 (c)(1),
(2) Date: Nov. 8, 2016

(87) PCT Pub. No.: WO2015/144317
PCT Pub. Date: Oct. 1, 2015

(65) Prior Publication Data
US 2017/0152841 A1  Jun. 1, 2017

(30) Foreign Application Priority Data

May 8, 2014  (DE) .................. 10 2014 006 759

(51) Int. Cl.
*F04B 9/133* (2006.01)
*B05B 9/04* (2006.01)
(Continued)

(52) U.S. Cl.
CPC ............ *F04B 9/133* (2013.01); *B05B 9/0403* (2013.01); *B05B 9/0409* (2013.01);
(Continued)

(58) Field of Classification Search
CPC ........ F04B 9/133; F04B 39/0027–0072; F04B 7/02; F04B 7/0233–025; F04B 9/129;
(Continued)

(56) References Cited

U.S. PATENT DOCUMENTS 1,923,333 A * 8/1933 Soter ..................... F04B 39/08
                                                    417/397
2,858,767 A * 11/1958 Smith .................. F01L 25/066
                                                    417/342
(Continued)

FOREIGN PATENT DOCUMENTS

CN       1099103 A      2/1995
CN       1517548 A      8/2004
(Continued)

OTHER PUBLICATIONS

International Search Report and Written Opinion for PCT/EP2015/000908 dated Aug. 10, 2015 (with English translation; 12 pages).
(Continued)

*Primary Examiner* — Alexander B Comley
(74) *Attorney, Agent, or Firm* — Bejin Bieneman PLC

(57) ABSTRACT

An exhaust air conduit for a pneumatically powered pump, in particular, from a coating agent pump in a painting plant, is provided. The conduit includes an inlet for receiving the exhaust air from the pump, an outlet for discharging the exhaust air, and an exhaust air channel in which the exhaust air flows from the inlet to the outlet of the exhaust air conduit, and a housing member in which the exhaust air channel extends. A first thermal insulation element is provided in the region of a direction change of the exhaust air channel, in order to prevent an accumulation of the exhaust air directly at the inner wall of the exhaust air channel and thereby to lessen the cooling of the housing member.

9 Claims, 5 Drawing Sheets

Figure 1:
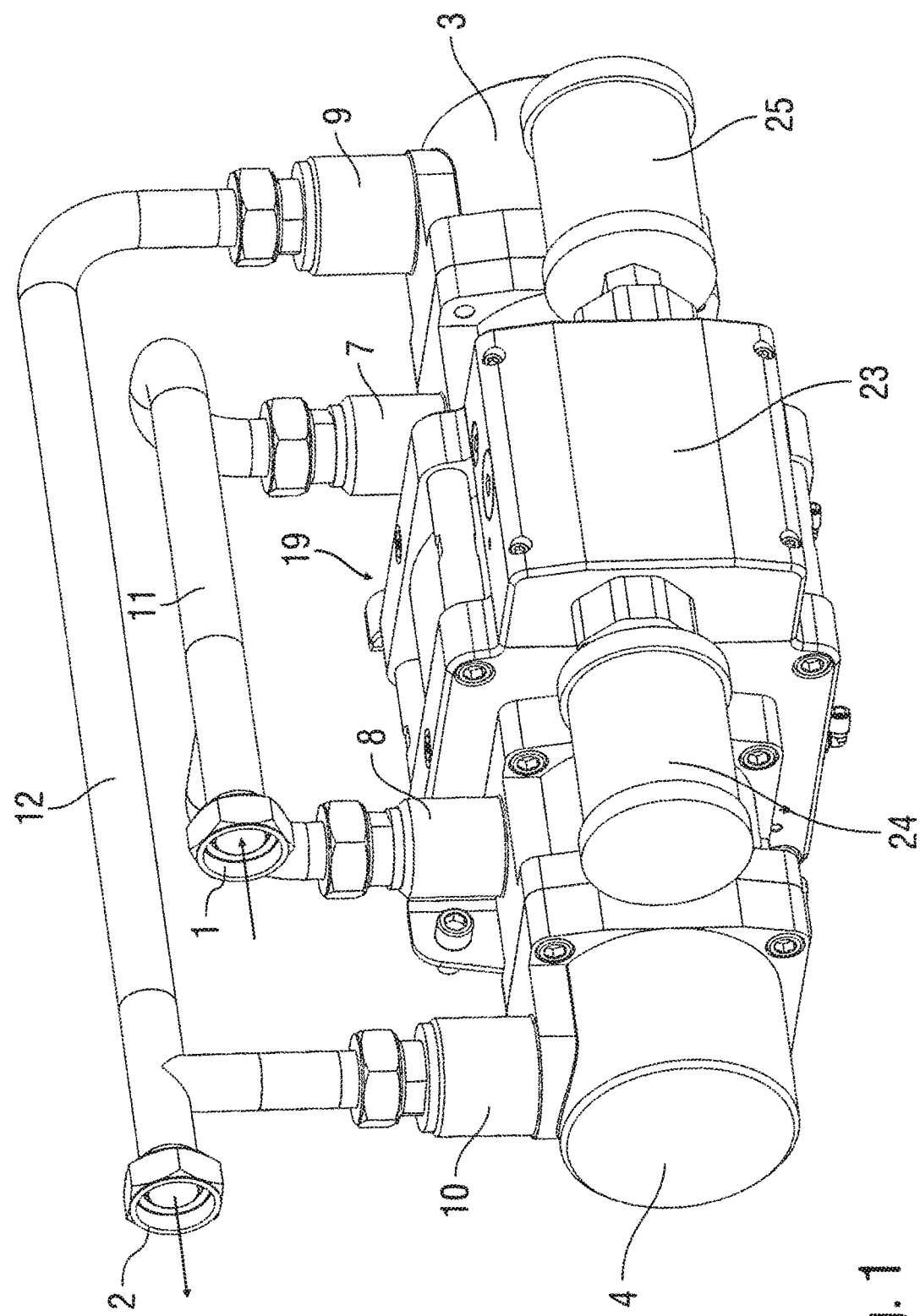

(51) Int. Cl.
  *F04B 43/073* (2006.01)
  *F04B 39/00* (2006.01)
  *F04B 7/02* (2006.01)
  *F04B 53/00* (2006.01)
  *F04B 23/06* (2006.01)
  *F04B 53/12* (2006.01)
  *F04B 49/22* (2006.01)
  *F04B 15/00* (2006.01)
  *F16L 55/033* (2006.01)

(52) U.S. Cl.
  CPC ............ *F04B 7/0266* (2013.01); *F04B 23/06* (2013.01); *F04B 39/0055* (2013.01); *F04B 39/0061* (2013.01); *F04B 43/073* (2013.01); *F04B 53/001* (2013.01); *F04B 15/00* (2013.01); *F04B 49/22* (2013.01); *F04B 53/126* (2013.01); *F16L 55/0336* (2013.01)

(58) Field of Classification Search
  CPC .......... F04B 9/131; F04B 15/02; F04B 23/06; F04B 9/123–1256; F04B 35/00; F04B 35/0055–0061; F04B 39/068; F04B 39/123; F04B 45/053–0536; F04B 45/08; F04B 45/16; F04B 7/0266; F04B 43/073; F04B 53/001; F04B 53/126; B05B 9/0403; B05B 9/0409
  USPC ........ 417/312, 395, 397, 403, 545, 552–554
  See application file for complete search history.

(56) References Cited

U.S. PATENT DOCUMENTS

| | | | | |
|---|---|---|---|---|
| 3,282,167 A * | 11/1966 | McKenzie | F01L 25/063 | 417/397 |
| 4,035,109 A * | 7/1977 | Drath | F01L 25/063 | 417/403 |
| 4,104,008 A * | 8/1978 | Hoffmann | F01L 25/063 | 417/397 |
| 4,350,266 A * | 9/1982 | Hetherington | B01F 15/0454 | 222/276 |
| 4,373,874 A * | 2/1983 | Phillips | F04B 9/115 | 417/397 |
| 4,659,294 A * | 4/1987 | Barthomeuf | F01L 25/066 | 417/397 |
| 4,730,991 A * | 3/1988 | Handfield | F04B 9/133 | 417/397 |
| 4,780,065 A * | 10/1988 | Sayers | F01L 25/06 | 417/403 |
| D302,557 S * | 8/1989 | Powers | D15/7 | |
| 4,981,418 A * | 1/1991 | Kingsford | F04B 9/133 | 340/605 |
| 5,094,596 A * | 3/1992 | Erwin | F04B 15/02 | 417/397 |
| 5,228,842 A * | 7/1993 | Guebeli | B05B 9/0413 | 277/530 |
| 5,324,175 A * | 6/1994 | Sorensen | F04B 9/133 | 417/254 |
| 5,368,452 A * | 11/1994 | Johnson | F04B 43/0736 | 137/338 |
| 5,415,531 A * | 5/1995 | Cavanaugh | F04B 9/133 | 277/636 |
| 5,423,662 A * | 6/1995 | Hetherington | F04B 9/133 | 417/429 |
| 5,494,194 A * | 2/1996 | Topper | A23G 9/28 | 222/146.6 |
| 5,520,520 A * | 5/1996 | Nakamoto | F01L 25/066 | 285/367 |
| 5,535,926 A * | 7/1996 | Blitz | B05C 17/002 | 222/334 |
| 5,584,666 A * | 12/1996 | Kozumplik, Jr. | F04B 43/073 | 137/102 |
| 5,626,467 A * | 5/1997 | Cantley | F01L 23/00 | 417/312 |
| 5,649,813 A * | 7/1997 | Able | F01B 31/02 | 417/387 |
| 5,860,794 A * | 1/1999 | Hand | F04B 9/135 | 417/393 |
| 5,927,954 A * | 7/1999 | Kennedy | F04B 43/0736 | 417/395 |
| 5,957,670 A * | 9/1999 | Duncan | F04B 43/0736 | 417/393 |
| 6,152,705 A * | 11/2000 | Kennedy | F04B 7/0241 | 137/102 |
| 6,790,010 B2 * | 9/2004 | Chen | F04B 9/125 | 417/384 |
| 7,168,928 B1 * | 1/2007 | West | F04B 9/133 | 417/385 |
| 7,287,964 B2 * | 10/2007 | Sanwald | B05B 7/1459 | 417/395 |
| 7,399,168 B1 * | 7/2008 | Eberwein | F04B 43/0736 | 417/395 |
| 2005/0232797 A1 * | 10/2005 | Riney | F04B 9/125 | 417/511 |
| 2005/0249612 A1 | 11/2005 | Distaso et al. | | |
| 2006/0159565 A1 | 7/2006 | Sanwald | | |
| 2007/0128053 A1 * | 6/2007 | Stamper | F04B 9/133 | 417/397 |
| 2013/0101445 A1 | 4/2013 | Schuetze et al. | | |
| 2015/0375249 A1 | 12/2015 | Schenke et al. | | |

FOREIGN PATENT DOCUMENTS

| | | |
|---|---|---|
| DE | 2659835 A1 | 3/1978 |
| DE | 44 25 515 A1 | 3/1995 |
| DE | 4425515 A1 | 3/1995 |
| IE | 10 2013 003 620 B4 | 2/2016 |

OTHER PUBLICATIONS

Chinese Office Action Search Report for Application No. 201580024122.7 dated Jun. 11, 2018 (8 pages; with English translation).

* cited by examiner

EXHAUST AIR CONDUIT FOR A COATING AGENT PUMP

CROSS-REFERENCE TO RELATED APPLICATIONS

This application is a national stage of, and claims priority to, Patent Cooperation Treaty Application No. PCT/EP2015/000908, filed on May 4, 2015, which claims priority to German Application No. DE 10 2014 006 759.9 filed on May 8, 2014, each of which applications are hereby incorporated herein by reference in their entireties.

BACKGROUND

The present disclosure relates to an exhaust air conduit for conducting away exhaust air from a pneumatically powered pump, in particular, from a coating agent pump in a painting plant.

In modern painting plants for painting motor vehicle bodywork components, pneumatically powered pumps are often used for pumping the paint to be applied. Such pneumatically powered pumps typically have a pneumatic cylinder and a piston which is displaceable in the pneumatic cylinder, and compressed air can be applied to the piston on both sides in order to displace the piston in the desired direction. Via a common piston rod, the piston in the pneumatic cylinder can deform, for example, two pumping diaphragms, as described in the German patent application DE 10 2013 003 620 B4. In such configurations, exhaust air from the pneumatic cylinder is typically controlled with a switch-over unit and is then discharged through a sound damper into the surroundings, with the sound damper is directly flange-mounted onto the switch-over unit.

It is disadvantageous in these known pumps that the exhaust air from the pneumatic cylinder is initially under pressure and then expands, which leads to intense cooling of the exhaust air. The cooling of the exhaust air can result in an undesirable formation of condensation, e.g. water collecting in the exhaust air conduit and, in particular, on the switch-over unit and the sound damper. It is possible that such expansion-induced cooling can, in some circumstances, freeze the condensation water and impairs the functional capability of the switch-over unit.

Additional examples of known pumps of this type are those disclosed in, for example, DE 44 25 515 A1 and U.S. Pat. No. 5,094,596.

SUMMARY

The exhaust air conduit according to the present disclosure has an inlet in order to receive the exhaust air from the pneumatically powered pump. Furthermore, the exhaust air conduit according to the present disclosure has an outlet in order to discharge the exhaust air to the surroundings. An exhaust air channel extends between the inlet of the exhaust air conduit and the outlet of the exhaust air conduit, in which exhaust air channel the exhaust air flows from the inlet to the outlet. The exhaust air channel is arranged in a housing member and, as set forth herein, undesirable magnitude of cooling of the housing member is inhibited according to the principles of the present disclosure, e.g. to prevent cooling of the housing member that results in the functional capability of the functional components in the housing member is impaired by condensation and/or freezing thereof.

Heat transfer from a wall of the exhaust air channel to the cold exhaust air flow in the exhaust air channel is particularly great if the exhaust air flow impacts obtusely or even at a right angle on the wall of the exhaust air channel. In the context of the present disclosure, therefore, the approach angle between the exhaust air stream and the wall of the exhaust air channel is, in some embodiments, configured to be in the region of 30°-90°, 45°-90°, 65°-90°, 80°-90° or even 85°-90°.

The present disclosure therefore, in some embodiments, directs the exhaust air flow in the exhaust air channel extends almost entirely parallel to the wall of the exhaust air channel.

Furthermore, in embodiments including a change of direction of the exhaust air conduit, the present disclosure provides that in the region of such a direction change of the exhaust air channel, a thermal insulation element is arranged in the exhaust air channel, whereby the exhaust air flow then impacts obtusely on the thermal insulation element and not on the wall of the exhaust air channel. Here, it should be understood, the term "obtusely" means that the exhaust air flow impacts on the wall of the thermal insulation element at an impact angle in the range of 30°-90°, 45°-90°, 65°-90°, 80°-90° or even 85°-90°. The cold exhaust air does in fact likewise accumulate at the thermal insulation element, which in principle favours the heat transfer from the thermal insulation element to the cold exhaust air. However, the thermal insulation element consists of a heat-insulating material (e.g. plastics), whereas the wall of the exhaust air channel typically consists of metal, which has a significantly better thermal conductivity than plastics. Thus in the case of an obtuse approach by the cold exhaust air, the first thermal insulation element reduces an intensive cooling of the wall of the exhaust air channel and thus also the other components (e.g. the switch-over unit) which are to be protected against cooling.

In some embodiments of the present disclosure, the first thermal insulation element lines the inside of the exhaust air channel. In such embodiments, the first thermal insulation element is a separate component from the exhaust air channel, which is inserted into the exhaust air channel. In other embodiments of the present disclosure, the first thermal insulation element is a conduit component of the exhaust air channel. For example, a bend in the exhaust air channel can be made of plastics, whereas the unbent conduit parts of the exhaust air channel are made of metal.

Such an exhaust air channel according to the present disclosure thereby mitigates thermal transfer from the wall of the exhaust air channel and from the components to be protected against cooling (e.g. the switch-over unit) to the cold exhaust air flow and thus prevent excessive cooling of the components to be protected.

Furthermore, the present disclosure may inhibit the exhaust air of the pump from cooling intensely at all. For this purpose, the present disclosure provides that the exhaust air channel has a cross-section which does not broaden in the flow direction, in order to prevent an expansion of the exhaust air and the expansion-induced cooling of the exhaust air in the exhaust air channel associated therewith. For example, in some embodiments, a cross-section of an exhaust air channel within an exhaust air conduit according to the present disclosure has a substantially constant size. Such a configuration may delay expansion of the exhaust air until it is downstream after the outlet of the exhaust air conduit, for example, in a sound damper connected thereto. The site of the expansion-induced cooling is herein therefore displaced in the flow direction out of the exhaust air conduit in the switch-over unit into the sound damper connected thereto, thereby resulting in components such as, e.g., the switch-over unit being cooled less intensely.

In some exemplary embodiments of the present disclosure, the exhaust air conduit extends through the switch-over unit of the pump. The switch-over unit herein has the task of steering the exhaust air out of the pneumatically powered pump and/or the feed air to the pneumatically powered pump. The exhaust air channel of the exhaust air conduit according to the present disclosure thus extends through the switch-over unit and, in some embodiments, to the sound damper.

The steering of the exhaust air of the pneumatically powered pump in the switch-over unit can take place, for example, with a diaphragm valve which has an elastic diaphragm for control. The elastic diaphragm can herein also fulfil the function of the first thermal insulation element described above. In the opened state of the diaphragm valve, the cold exhaust air therefore impacts obtusely on one side of the elastic diaphragm. As the elastic diaphragm is formed of a heat-insulating material (e.g. plastics), an excessive cooling of the diaphragm is prevented.

In some embodiments in which the expansion-induced cooling is displaced in the flow direction from the interior of the switch-over unit into the sound damper, an expansion-induced cooling of the exhaust air in the sound damper results and, thus, also a corresponding cooling of the sound damper itself. In such embodiments, according to the principles of the present disclosure, such cooling of the sound damper is prevented from, in turn, cooling the switch-over unit. For this purpose, in such embodiments, the sound damper is thermally decoupled from the switch-over unit in order to lessen heat transfer from the switch-over unit to the sound damper. The sound damper is thermally decoupled from the switch-over unit by being free of a direct connection to the switch-over unit. Rather, the sound damper is indirectly connected to the switch-over unit via a second thermal insulation element, which is formed of a thermally insulating material (e.g. plastics). In such embodiments, therefore, the exhaust air channel extends through the switch-over unit and the second thermal insulation element into the sound damper. For example, in embodiments with a low thermal conductivity of the second thermal insulation element, the switch-over unit cools only slightly as a result of expansion-induced cooling of the sound damper.

As mentioned above, the thermal insulation elements can consist of plastics, whereas the switch-over unit, the housing member of the exhaust air conduit and/or the wall of the exhaust air channel can consist of metal. With regard to material selection, however, the present disclosure is not restricted to these materials. Rather, according to the principles of the present disclosure, the materials of the thermal insulation elements are selected to have a significantly lower thermal conductivity than the materials of the switch-over unit, the housing member and/or the wall of the exhaust air channel.

The present disclosure also includes a corresponding coating agent pump with an exhaust air conduit as disclosed herein.

In some embodiments, a coating agent pump according to the principles of the present disclosure has two oppositely arranged pumping cylinders, each having a displaceable piston, wherein the two pistons in the pumping cylinders are linked to a common piston rod and are therefore driven in opposing directions. The driving of the piston rod and thus also the driving of the two pistons in the pumping cylinders is achieved with a pneumatic cylinder in which a further piston is provided which acts upon the common piston rod. Compressed air can be admitted to the piston in the pneumatic cylinder on both sides in order to move the piston in the pneumatic cylinder and thus also the two pistons in the pumping cylinders in the desired direction.

In each of the pistons in the pumping cylinders, a non-return valve is provided which closes during a discharge stroke of the respective piston and is open during a filling stroke.

It should be understood that the present disclosure is not restricted to the exhaust air conduits of paint pumps, i.e. pumps which pump paint. Rather, an exhaust air conduit according to the present disclosure may also be utilized for other pumps that are pneumatically powered and pump other fluids, for example, adhesives or sealants (e.g. for seam sealing).

DRAWINGS

Figure 2:
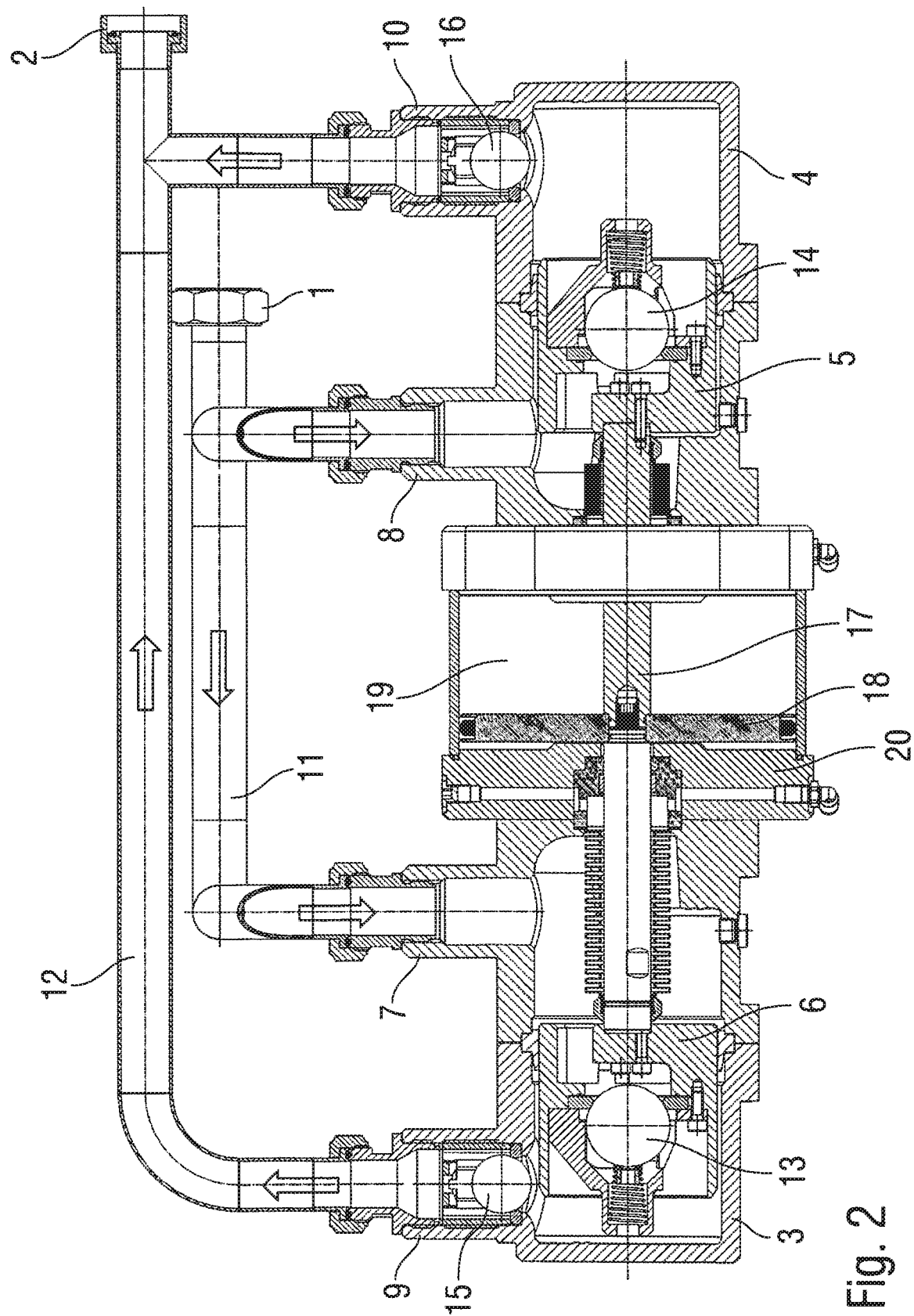
Figure 3:
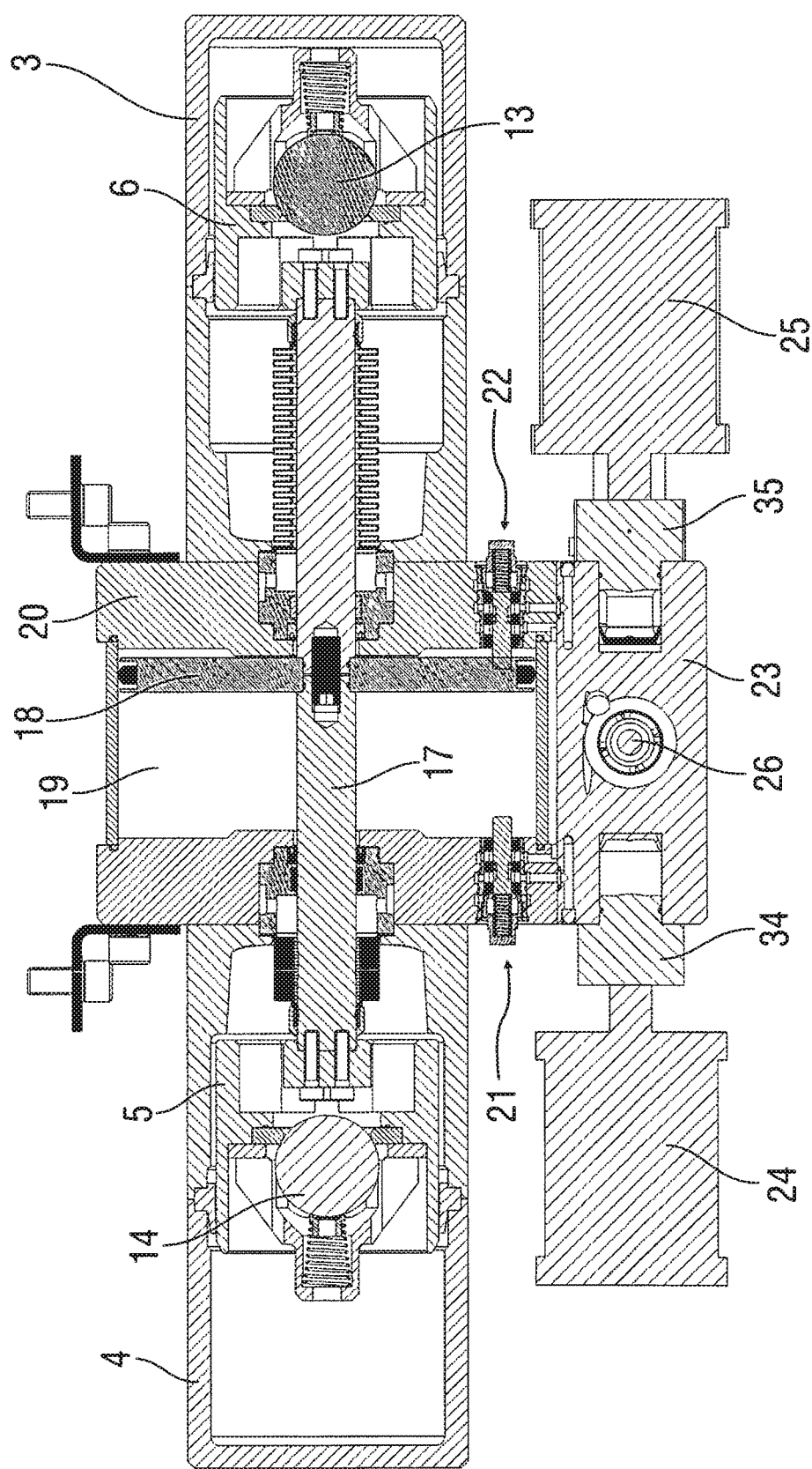
Figure 4:
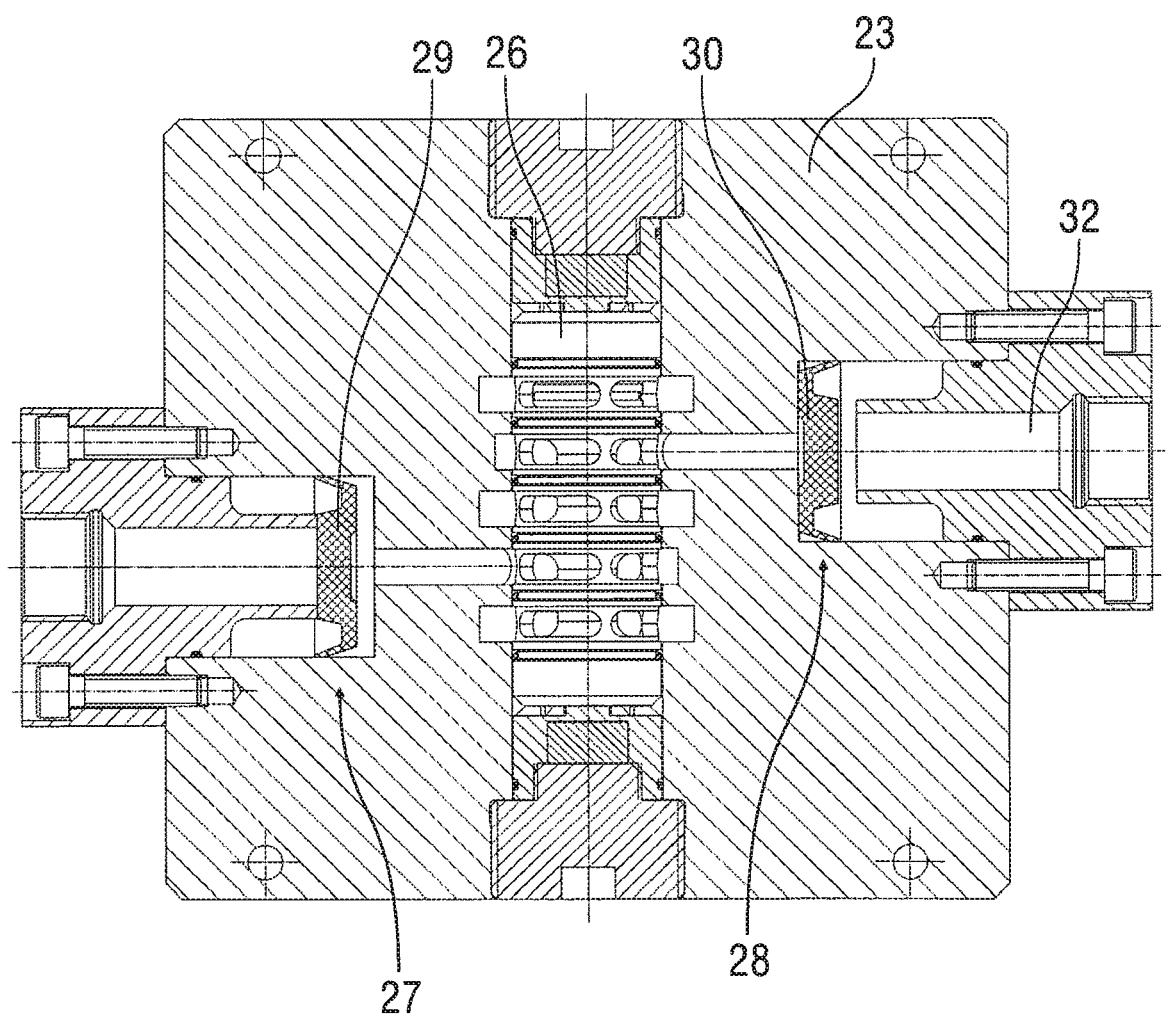

Other features of the present disclosure are described below in further detail in the following description the present disclosure, making reference to the drawings, in which:

FIG. 1 shows a perspective view of a coating agent pump for pumping paint in a painting plant according to the principles of the present disclosure, FIG. 2 shows a cross-sectional side view of the coating agent pump of FIG. 1, FIG. 3 shows another cross-sectional top view through the coating agent pump of FIGS. 1 and 2, FIG. 4 shows a cross-sectional view through the switch-over unit of the coating agent pump of FIGS. 1-3, and FIG. 5 shows another cross-sectional view of the switch-over unit.

DESCRIPTION

The present disclosure includes, e.g., a coating agent pump for pumping paint in a painting plant for painting motor vehicle bodywork components.

Referring to FIGS. 1-3, the paint to be pumped is herein received via a pump inlet 1 and is discharged via a pump outlet 2 at the desired delivery pressure. The actual pumping is herein achieved by two pumping cylinders 3, 4 in each of which a displaceable pumping piston 5, 6 is arranged.

The two pumping cylinders 3, 4 each have a coating agent inlet 7, 8 and a coating agent outlet 9, 10. The pump inlet 1 is connected via a tube 11 to the two coating agent inlets 7, 8 of the pumping cylinders 3, 4. The pump outlet 2 is connected in the same way via a tube 12 to the two coating agent outlets 9, 10 of the pumping cylinders 3, 4.

Situated in each of the pumping pistons 5, 6 are respective non-return valves 13, 14 which only open in one direction. Thus, with particular reference to FIG. 2, the non-return valve 13 in the pumping piston 6 closes when the pumping piston 6 moves from right to left during a discharge stroke. During a movement of the pumping piston 6 in the contrary direction from left to right, however, the non-return valve 13 opens, so that new coating agent can flow via the coating agent inlet 7 through the non-return valve 13 to the left side of the pumping piston 5.

Non-return valves 15, 16 are also arranged, respectively, in each of the two coating agent outlets 9, 10. The two non-return valves 15, 16 each open during a discharge stroke of the associated pumping piston 5, 6 and otherwise close.

The mechanical drive of the two pumping pistons 5, 6 takes place through a common piston rod 17, so that the two pumping pistons 5, 6 always move in relatively opposing directions i.e. in the two pumping pistons 5, 6, the discharge stroke and the filling stroke each take place in phase opposition.

The mechanical drive of the common piston rod 17 is provided via a pneumatic piston 18 which is arranged in a pneumatic cylinder 19 and to which compressed air can be applied on both sides. FIGS. 2 and 3 both show the pneumatic piston 18 at a respective dead point.

Two switch-over valves 21, 22 which are actuated by the pneumatic piston 18 when the pneumatic piston 18 reaches one of its deadpoints are arranged in a housing 20 of the pneumatic cylinder 19. Thus the pneumatic piston 18 in FIGS. 2 and 3 activates the switch-over valves, 21, 22.

The two switch-over valves 21, 22 also control the exhaust air from the pneumatic cylinder 19 on both sides of the pneumatic piston 18. The exhaust air from the pneumatic cylinder 19 is then conducted away by an exhaust air conduit, wherein the exhaust air conduit extends through a switch-over unit 23 into two sound dampers 24, 25. With additional reference to FIG. 4, arranged in the switch-over unit 23 herein is a slide valve 26 which can be displaced in the, e.g., vertical direction, wherein the position of the slide valve 26 is set pneumatically with the switch-over valves 21, 22. The position of the slide valve 26 in the switch-over unit 23, in turn, controls two diaphragm valves 27, 28 which are arranged in the exhaust air channel of the exhaust air conduit and, with respective elastic diaphragm valve components 29, 30 made of plastics, release or block the exhaust air flow.

As particularly illustrated in FIG. 4, the diaphragm valve 27 is shown in a closed position, while the diaphragm valve 28 is opened on the opposite side.

Figure 5:
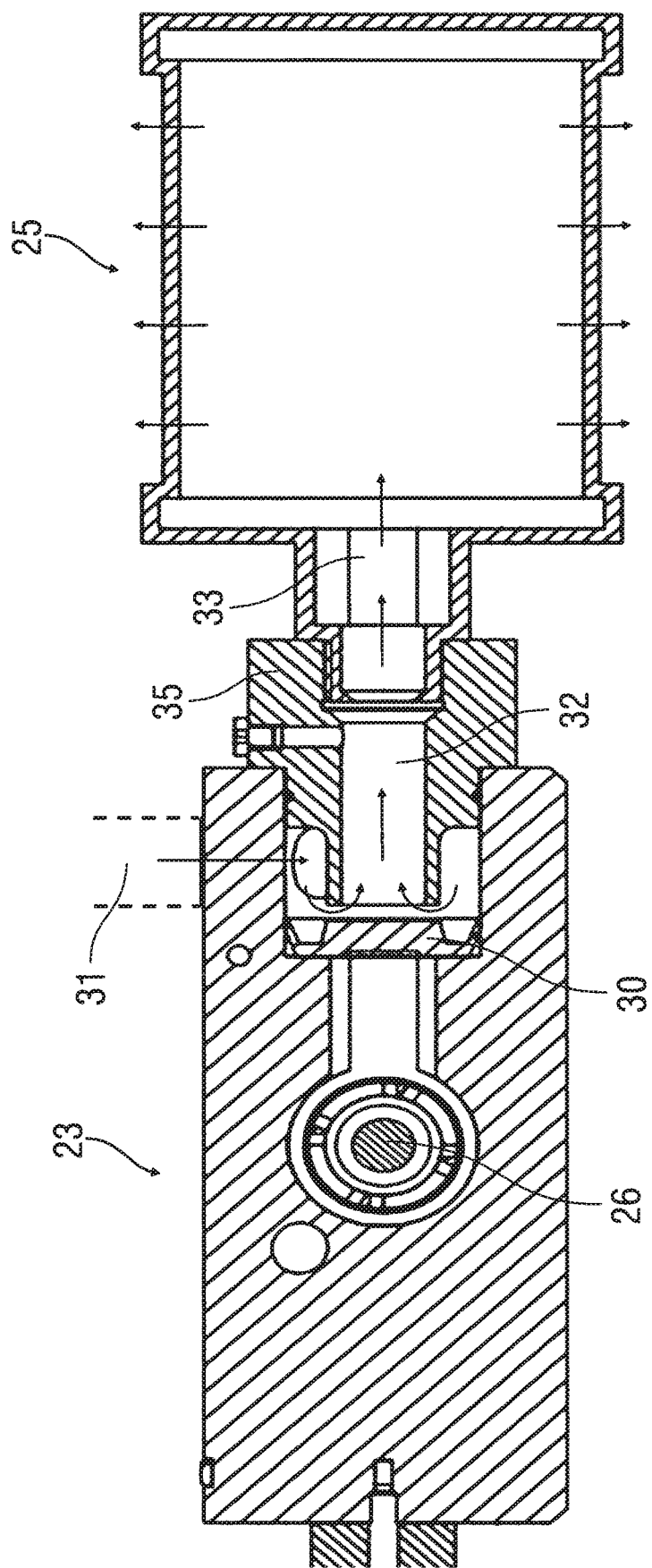

With additional reference to FIG. 5, the exhaust air conduit according to the present disclosure has an inlet 31 at which the exhaust air from the pneumatic cylinder 19 is received. The exhaust air then flows through an exhaust air channel 32 to an outlet 33 to which one of the sound dampers 24 and 25 is connected. The exhaust air channel 32 herein already belongs to one of the sound dampers 24 and 25.

In some exemplary embodiments, the cross-section of the exhaust air channel 32 between the inlet 31 and the outlet 33 is approximately constant so that expansion of the exhaust air is inhibited in the exhaust air channel 32, to, in turn, inhibit expansion-induced cooling. In this way, the present disclosure thus inhibits or prevents occurrence of a substantial cooling in the region of the switch-over unit 23, i.e. prevents the formation of condensation water and/or ice at the switch-over unit 23.

In such embodiments, the exhaust air is expanded in the sound damper 24 and/or 25, leading to corresponding cooling of the exhaust air and thus also of the sound damper 24 and/or 25. However, referring in particular to FIG. 3, the sound dampers 24 and 25 are thermally decoupled from the switch-over unit 23 by a thermal insulation elements 34 and 35, respectively, and each exhaust air channel 32 extends through the thermal insulation element 34 and/or 35 to the respective sound damper 24 and/or 25. This thermal decoupling with the thermal insulation elements 34 and 35 inhibits cooling of the sound dampers 24 and/or 25 from, in turn, causing excessive cooling of the switch-over unit 23.

Furthermore, according to the present disclosure, the exhaust air flow in the exhaust air channel 32 in the region of the direction change does not impact upon the housing of the switch-over unit 23 made of metal, but on the thermal insulation sidewall element of the channel 32 or on the valve diaphragm 30 made of plastics. Through such insulation of the channel 32 at changes of direction of the air flow counteracts the increased potential heat transfer possible with a flow changing direction.

The present disclosure is not restricted to the above-described exemplary embodiments. Rather a plurality of variants and modifications which also make use of the principles of the present disclosure are possible.

The invention claimed is:

1. An exhaust air conduit for a pneumatically powered pump, the exhaust air conduit comprising:
   a housing member;
   a first insulation element mechanically coupled to the housing member and at least partially extending into the housing member, the first insulation element having less thermal conductivity than the housing member;
   an exhaust air channel extending between an inlet and an outlet, the inlet opening into the housing member,
   the housing member configured to receive exhaust air from a pump, the housing member configured to receive the volume of exhaust air at the inlet,
   the outlet configured to discharge the exhaust air, the exhaust air channel having a first part disposed between the inlet and an opening into the first insulation element, the exhaust air channel having a second part axially extending between the opening into the first insulation element and the outlet, the inlet being radially spaced from the second part of the exhaust air channel,
   wherein the first part of the exhaust air channel extends in a first direction obtuse to an exterior surface of the first insulation element within the housing member, the first part of the exhaust air channel having a direction change at the exterior surface of the first insulation element,
   wherein the exhaust air channel, from the inlet to the outlet, has a maximum cross-sectional area at the inlet,
   wherein a damper body is mechanically coupled to the housing member and thermally decoupled from the housing member, the damper body defining a chamber therein that is fluidly connected to the outlet of the exhaust air channel, the damper body being configured to receive the exhaust air discharged from the outlet, accommodate expansion of the exhaust air, and discharge the exhaust air,
wherein the damper body is mechanically coupled to the housing member with the first insulation element in series therebetween.

2. The exhaust air conduit of claim 1, wherein the first insulation element thermally decouples the damper body from the housing member.

3. The exhaust air conduit according to claim 2, wherein the first insulation element includes a plastic material.

4. The exhaust air conduit according to claim 1, wherein a diaphragm valve with an elastic diaphragm is coupled in the housing member in fluid communication with the exhaust air channel, and the elastic diaphragm is a second insulation element.

5. The exhaust air conduit according to claim 1, wherein the housing member is metallic.

6. A coating agent pump with an exhaust air conduit according to claim 1.

7. The coating agent pump according to claim 6, further comprising:
   a first pumping cylinder,
   a first piston which is displaceably coupled in the first pumping cylinder,
   a second pumping cylinder, a second piston which is displaceably coupled in the second pumping cylinder, a coating agent inlet member opening into both the first and second pumping cylinders, a coating agent outlet member opening into both the first and second pumping cylinders, a piston rod coupled to each of the first piston and the second piston and configured to drive the first and second pistons, a pneumatic cylinder, and a third piston coupled in the pneumatic cylinder, the third piston configured to drive the piston rod.

8. The coating agent pump according to claim 7, further comprising:

a first non-return valve arranged in the first piston, a second non-return valve arranged in the second piston, a third non-return valve arranged in the coating agent outlet member at the first pumping cylinder, and a fourth non-return valve arranged in the coating agent outlet member at the second pumping cylinder, wherein a valve is configured to control feed air into the pneumatic cylinder and the exhaust air out of the pneumatic cylinder, and the first, second, and the third pistons are, respectively, coaxially arranged with each other and are each directly connected to the piston rod.

9. The exhaust air conduit according to claim 1, wherein the second part of the exhaust air channel is defined within the first insulation element.

* * * * *